United States Patent
Feigleson et al.

(10) Patent No.: US 9,045,985 B2
(45) Date of Patent: Jun. 2, 2015

(54) STATOR VANE BUMPER RING

(75) Inventors: Steven J. Feigleson, Falmouth, ME (US); David P. Dube, Saco, ME (US)

(73) Assignee: United Technologies Corporation, Hartford, CT (US)

( * ) Notice: Subject to any disclaimer, the term of this patent is extended or adjusted under 35 U.S.C. 154(b) by 511 days.

(21) Appl. No.: 13/485,628

(22) Filed: May 31, 2012

(65) Prior Publication Data
US 2013/0323038 A1    Dec. 5, 2013

(51) Int. Cl.
*F04D 9/04*        (2006.01)
*F01D 9/04*        (2006.01)
*F01D 25/28*      (2006.01)

(52) U.S. Cl.
CPC ........... *F01D 9/042* (2013.01); *Y10T 29/49011* (2013.01); *F01D 25/28* (2013.01); *F05D 2230/642* (2013.01); *F05D 2260/30* (2013.01); *Y02T 50/671* (2013.01)

(58) Field of Classification Search
CPC ......... F01D 9/00; F01D 9/042; F01D 25/285; F01D 25/28; F01D 25/246; F01D 11/005; F04D 29/542
USPC ................ 415/119, 191, 208.1, 208.2, 209.2, 415/209.3, 209.4, 210.1
See application file for complete search history.

(56) References Cited

U.S. PATENT DOCUMENTS

| | | | |
|---|---|---|---|
| 2,658,719 A | 11/1953 | Johanson | |
| 2,812,159 A | 11/1957 | Krebs | |
| 4,643,636 A | 2/1987 | Libertini et al. | |
| 4,710,097 A | 12/1987 | Tinti | |
| 5,074,752 A | 12/1991 | Murphy et al. | |
| 5,346,362 A | 9/1994 | Bonner et al. | |
| 5,494,404 A | 2/1996 | Furseth et al. | |
| 5,547,342 A | 8/1996 | Furseth et al. | |
| 5,569,019 A | 10/1996 | Katariya et al. | |
| 5,653,580 A | 8/1997 | Faulder et al. | |
| 5,681,142 A * | 10/1997 | Lewis .......................... | 415/119 |
| 6,409,472 B1 | 6/2002 | McMahon et al. | |
| 6,561,757 B2 | 5/2003 | Burdgick et al. | |
| 6,595,747 B2 | 7/2003 | Bos | |
| 6,619,917 B2 | 9/2003 | Glover et al. | |
| 6,655,912 B2 | 12/2003 | Bos | |
| 6,971,845 B2 | 12/2005 | Weaver | |
| 7,025,563 B2 | 4/2006 | Servadio et al. | |
| 7,311,495 B2 | 12/2007 | Ashley et al. | |

(Continued)

FOREIGN PATENT DOCUMENTS

EP              2204539 A2      7/2010

OTHER PUBLICATIONS

International Search Report and Written Opinion dated Sep. 12, 2013 from the PCT Serial No. PCT/ US2013/043079, 11 pages.

*Primary Examiner* — Edward Look
*Assistant Examiner* — Christopher J Hargitt
(74) *Attorney, Agent, or Firm* — Kinney & Lange, P.A.

(57) ABSTRACT

An assembly for use in a gas turbine engine includes an inner diameter (ID) shroud having a plurality of ID slots and an outer diameter (OD) shroud having a plurality of OD slots and positioned radially outward from the ID shroud. A plurality of stator airfoils extend from the ID shroud to the OD shroud. Each of the stator airfoils is positioned at least partially in one of the ID slots and is positioned at least partially in one of the OD slots. A bumper is positioned proximate a first end of each of the stator airfoils so as to limit movement of the stator airfoils in a radial direction.

17 Claims, 3 Drawing Sheets

(56) References Cited

U.S. PATENT DOCUMENTS

| | | |
|---|---|---|
| 7,481,618 B2 | 1/2009 | Booth et al. |
| 7,494,316 B2 | 2/2009 | Barnett et al. |
| 7,530,782 B2 | 5/2009 | Barnett et al. |
| 2009/0208332 A1* | 8/2009 | Weinstein et al. .......... 415/209.3 |
| 2010/0166545 A1* | 7/2010 | Schuler et al. ................ 415/189 |
| 2010/0221115 A1 | 9/2010 | Jardine et al. |

* cited by examiner

STATOR VANE BUMPER RING

CROSS-REFERENCE TO RELATED APPLICATION

Reference is made to application Ser. No. 13/485,616 entitled "Stator Vane Mistake Proofing", which is filed on even date and are assigned to the same assignee as this application, the disclosure of which is incorporated by reference in its entirety.

BACKGROUND

The present invention relates to gas turbine engines, and in particular, to stator vanes for use in gas turbine engines. Gas turbine engines typically include one or more compressor stages as well as one or more turbine stages, each with rotating rotor blades and stationary stators. In some gas turbine engines, a stator assembly includes a stator airfoil extending between two shrouds.

Such stator airfoils typically include two ends, and can be connected at one or both ends. Such connections are typically rigid connections to hold the stator airfoils rigidly in place. Such rigid connections can cause the stator airfoils to experience high stresses at certain stress points, such as 12,000 psi (pounds per square inch) (82,737,087.5 pascals) or more. These high stresses can cause such stator airfoils to fail over time. Stator airfoils can be made with high performance materials in effort to withstand these stresses. However, such material can be undesirably expensive to manufacture and can also be relatively heavy, adding undesirable weight to the gas turbine engine.

SUMMARY

According to the present invention, an assembly for use in a gas turbine engine includes an inner diameter (ID) shroud having a plurality of ID slots and an outer diameter (OD) shroud having a plurality of OD slots and positioned radially outward from the ID shroud. A plurality of stator airfoils extend from the ID shroud to the OD shroud. Each of the stator airfoils is positioned at least partially in one of the ID slots and is positioned at least partially in one of the OD slots. A bumper is positioned proximate a first end of each of the stator airfoils so as to limit movement of the stator airfoils in a radial direction.

Another embodiment of the present invention is a bumper ring for use in a stator vane assembly in a gas turbine engine. The bumper ring includes an axially aligned annular portion having a radially outer bumper surface and a radially aligned annular portion. The radially aligned annular portion includes a plurality of connection flanges extending radially inward and holes extending axially through each of the connection flanges. A bend connecting the radially aligned annular portion to the axially aligned annular portion.

Another embodiment of the present invention is a method of assembling a stator assembly. The method includes inserting a stator airfoil through a first slot in a first shroud and then through a second slot in a second shroud, attaching the stator airfoil to the first and second shrouds via resilient potting material, and attaching a bumper proximate an end of the stator airfoil nearest the first shroud.

DETAILED DESCRIPTION

Figure 1:
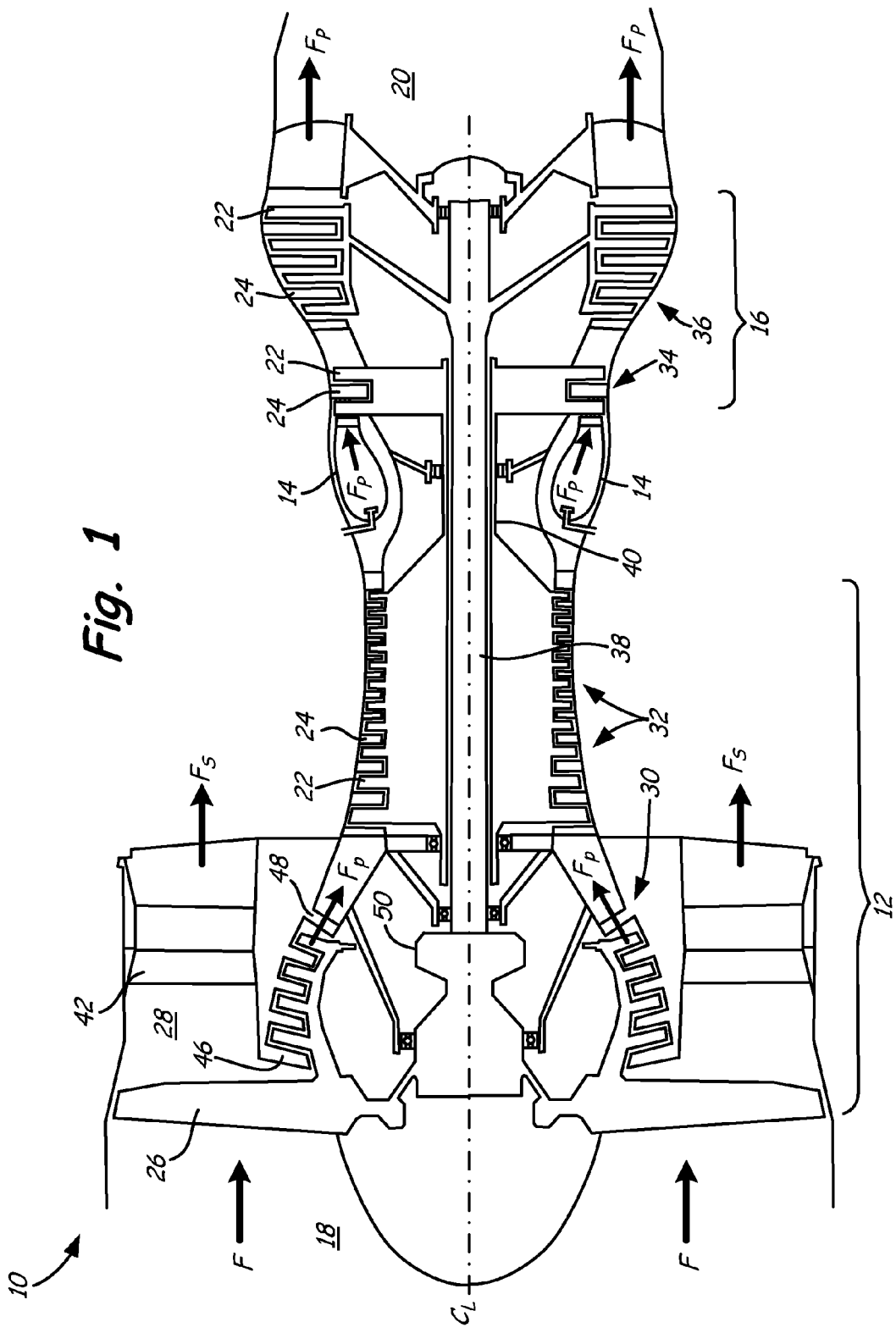
FIG. 1 is a cross-sectional view of a gas turbine engine.

FIG. 1 is a cross-sectional view of gas turbine engine 10. Gas turbine engine 10 includes a power core with compressor section 12, combustor 14 and turbine section 16 arranged in flow series between upstream inlet 18 and downstream exhaust 20. Compressor section 12 and turbine section 16 are arranged into a number of alternating stages of rotor airfoils (or blades) 22 and stator airfoils (or vanes) 24.

In the embodiment of FIG. 1, gas turbine engine 10 is a turbofan engine with propulsion fan 26 positioned in bypass duct 28, which is coaxially oriented about the engine core along centerline axis (or turbine axis) $C_L$. Alternatively, propulsion fan 26 can be an open-rotor propulsion fan, with turbine engine 10 operating as a turboprop or unducted turbofan engine. Alternatively, propulsion fan 26 and bypass duct 28 may be absent, with turbine engine 10 configured as a turbojet or turboshaft engine, or an industrial gas turbine.

In the two-spool, high bypass configuration of FIG. 1, compressor section 12 includes low pressure compressor (LPC) 30 and high pressure compressor (HPC) 32, and turbine section 16 includes high pressure turbine (HPT) 34 and low pressure turbine (LPT) 36. Low pressure compressor 30 is rotationally coupled to low pressure turbine 36 via low pressure (LP) shaft 38, forming the LP spool or low spool. High pressure compressor 32 is rotationally coupled to high pressure turbine 34 via high pressure (HP) shaft 40, forming the HP spool or high spool.

Flow F at inlet 18 divides into primary (core) flow $F_P$ and secondary (bypass) flow $F_S$ downstream of propulsion fan 26. Propulsion fan 26 accelerates secondary flow $F_S$ through bypass duct 28, with fan exit guide vanes (FEGVs) 42 to reduce swirl and improve thrust performance. In some designs, FEGVs 42 can be structural guide vanes (SGVs), providing combined flow turning and load bearing capabilities.

Flow F passes from propulsion fan 26 to low pressure compressor 30 whereby it becomes primary flow $F_P$. Primary flow $F_P$ is compressed in low pressure compressor 30 and high pressure compressor 32, then mixed with fuel in combustor 14 and ignited to generate hot combustion gas. The combustion gas expands to provide rotational energy in high pressure turbine 34 and low pressure turbine 36, driving high pressure compressor 32 and low pressure compressor 30, respectively. Expanded combustion gases exit through exhaust section (or exhaust nozzle) 20, which can be shaped or actuated to regulate the exhaust flow and improve thrust performance. When passing through low pressure compressor 30, primary flow $F_P$ flows in through fan exit stators (FESs) 46 and out through exit guide vanes (EGVs) 48.

Low pressure shaft 38 and high pressure shaft 40 are mounted coaxially about centerline axis $C_L$, and rotate at different speeds. Propulsion fan 26 can be rotationally coupled to low pressure shaft 38. In one embodiment, propulsion fan 26 can be coupled to low pressure shaft 38 so as to rotate at a common rotational speed with low pressure shaft 38. In alternative embodiments, fan drive gear system 50 can be provided for additional fan speed control, improving thrust performance and efficiency with reduced noise output. Gas turbine engine 10 can thus encompass a wide range of different shaft, spool and turbine engine configurations, including one, two and three-spool turboprop and (high or low bypass)

turbofan engines, turboshaft engines, turbojet engines, and multi-spool industrial gas turbines.

Figure 2:
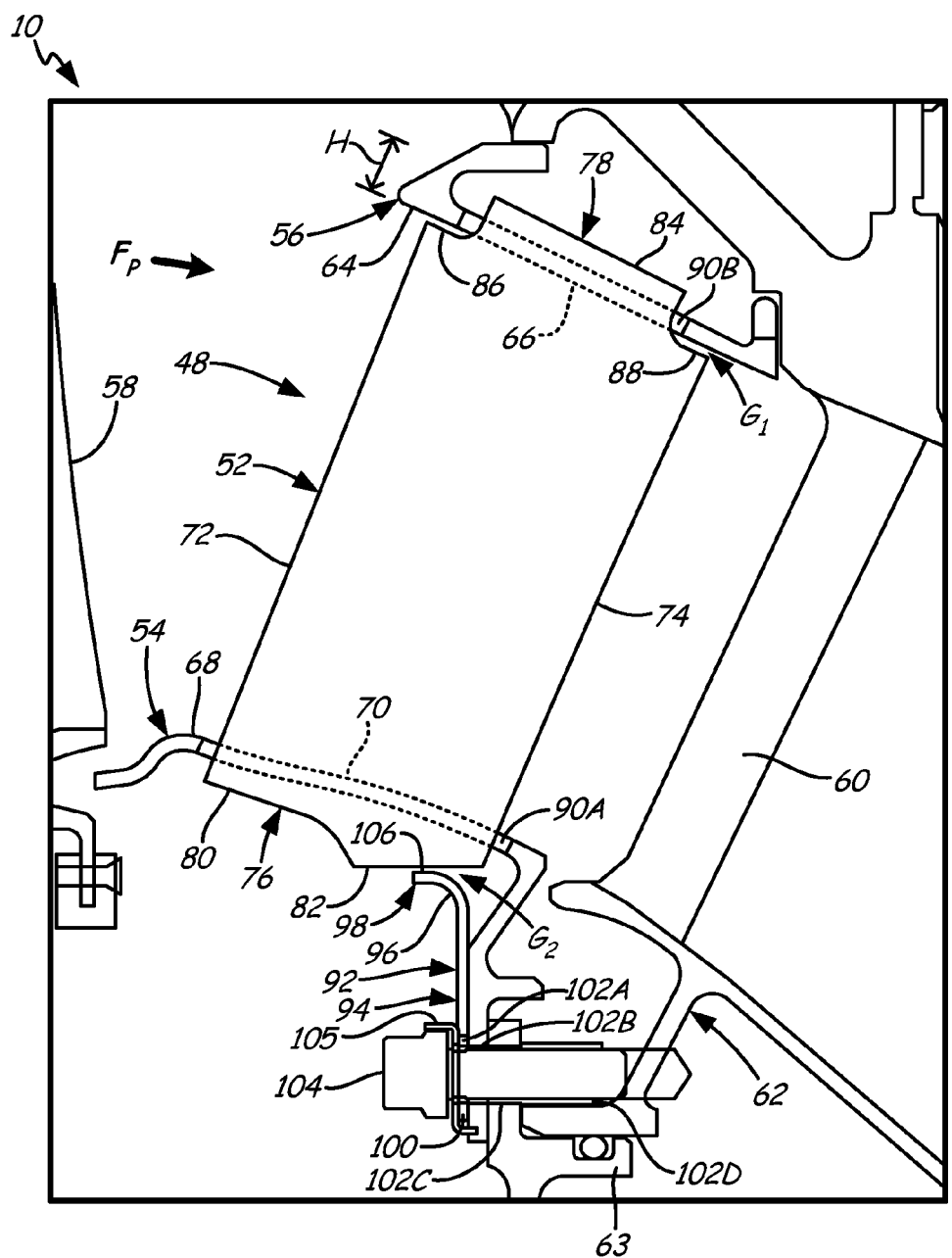
FIG. 2 is a partial side sectional view of an exit guide vane of the gas turbine engine of FIG. 1.

FIG. 2 is a partial side sectional view of EGV 48 of gas turbine engine 10. EGV 48 includes stator airfoil 52 extending from inner diameter (ID) shroud 54 to outer diameter (OD) shroud 56. EGV 48 is positioned downstream of low pressure compressor rotor blade 58 and upstream of strut 60. Strut 60 is one of a plurality of struts that are part of support frame 62. Support frame 62 provides structural support for gas turbine engine 10, including EGV 48. Support frame 62 connects ID shroud 54 and OD shroud 56. In the illustrated embodiment, support frame 62 is an intermediate case that also includes bearing cover 63.

OD shroud 56 includes OD gas path surface 64 and OD slot 66. ID shroud 54 includes ID gas path surface 68 and ID slot 70. Stator airfoil 52 extends from ID shroud 54 to OD shroud 56. Stator airfoil 52 is positioned at least partially in OD slot 66 and at least partially in ID slot 70. Slots 66 and 70 are elongated holes sized to allow insertion of stator airfoil 52. Stator airfoil 52 has leading edge 72, trailing edge 74, radially inner edge 76, and radially outer edge 78.

Radially inner edge 76 is an end of stator airfoil 52 that includes free portion 80 and bumper portion 82. Both free portion 80 and bumper portion 82 are positioned radially inward of ID shroud 54, on an opposite side of primary flow $F_P$. In the illustrated embodiment, free portion 80 is curved and bumper portion 82 is flat. Bumper portion 82 is aligned substantially parallel with centerline axis $C_L$ (shown in FIG. 1).

Radially outer edge 78 is an end of stator airfoil 52 that includes free portion 84 positioned between upstream shoulder 86 and downstream shoulder 88. Free portion 84 is positioned radially outward of OD shroud 56, on an opposite side of primary flow $F_P$, while shoulders 86 and 88 are positioned radially inward of OD shroud 56. Shoulders 86 and 88 overhang past OD slot 66 such that shoulders 86 and 88 would contact or bump against OD gas path surface 64 of OD shroud 56 if stator airfoil 52 were to move radially outward. Thus, the overhang of shoulders 86 and 88 can prevent stator airfoil 52 from sliding radially outward through OD slot 66. In the illustrated embodiment, free portion 84, shoulder 86, and shoulder 88 are substantially straight, with curved fillets connecting free portion 84 to shoulders 86 and 88. Free portion 84, shoulder 86, and shoulder 88 are angled with respect to centerline axis $C_L$. Shoulders 86 and 88 are spaced from OD gas path surface 64 by gap $G_1$. Free portion 84 is spaced from OD gas path surface 64 by height H. Thus, free portion 84 extends above shoulders 86 and 88 by a distance of $G_1+H$.

Stator airfoil 52 is attached to ID shroud 54 via potting material 90A, positioned in ID slot 70 between stator airfoil 52 and ID stator 54. Stator airfoil 52 is attached to OD shroud 56 via potting material 90B, positioned in OD slot 66 between stator airfoil 52 and OD shroud 56. In one embodiment, potting material 90A and 90B can be silicone rubber, or another suitable resilient material. Potting material 90A and 90B can be applied to ID slot 70 and OD slot 66 as a liquid and then allowed to solidify. Potting material 90A and 90B can hold stator airfoil 52 so as to be spaced from and avoid contact with ID shroud 54, OD shroud 56, and bumper 92. This spacing can reduce transmission of undesirable vibrations between stator airfoil 52 and ID shroud 54, OD shroud 56, and bumper 92. In the illustrated embodiment, stator airfoil 52 is in physical contact with no part of gas turbine engine 10 except for potting material 90A and 90B.

Bumper 92 is proximate radially inner edge 76. Bumper 92 is proximate and spaced from bumper portion 82 by gap $G_2$. In the illustrated embodiment, bumper 92 is a bumper ring that includes radially aligned portion 94, bend 96, and axially aligned portion 98. Radially aligned portion 94 is substantially aligned in a radial direction, extending radially outward from centerline axis $C_L$ (shown in FIG. 1). Radially aligned portion 94 includes flange 100 and bolt hole 102A passing through flange 100. Bolt holes 102B, 102C, and 102D pass through ID shroud 54, bearing cover 63, and intermediate case 62, respectively. Bolt 104 extends through bolt holes 102A-102D to connect bumper 92, ID shroud 54, bearing cover 63, and intermediate case 62. Cup washer 105 holds and restricts rotation of bolt 104.

Axially aligned portion 98 of bumper 92 is substantially aligned in an axial direction. Thus, axially aligned portion 98 is parallel to centerline axis $C_L$. Axially aligned portion 98 includes bumper surface 106, spaced from bumper portion 82 of stator airfoil 52 by gap $G_2$. Bumper surface 106 is also substantially axially aligned and substantially parallel with bumper portion 82. Bumper surface 106 is the radially outer most surface of axially aligned portion 98 and of bumper 92.

During assembly of EVG 48, stator airfoil 52 is inserted through ID shroud 54 and OD shroud 56 in a direction from radially inward to radially outward. Radially outer edge 78 of stator airfoil 52 first passes through ID slot 70 and then passes through OD slot 66, such that free portion 84 extends radially outward of OD shroud 56, while shoulders 86 and 88 remain radially inward from OD shroud 56 as illustrated. Radially inner edge 76 of stator airfoil 52 remains radially inward from ID shroud 54. Potting material 90A and 90B is then applied to ID slot 70 and OD slot 66 and allowed to solidify. A similar procedure is repeated with other stator airfoils (not shown) positioned circumferentially around EVG 48 to connect those stator airfoils to ID shroud 54 and OD shroud 56.

Bumper 92 is then positioned radially inward of stator airfoil 52 (and the other stator airfoils of EGV 48) and attached via bolt 104. Bolt 104 is one of a plurality of bolts that attach bumper 92. Bumper 92 is positioned radially inward but spaced from stator airfoil 52.

During normal operation, bumper 92 is not necessary to hold stator airfoil 52 in place. Stator airfoil 52 can be held in place exclusively by potting material 90A and 90B, as described above. Potting material 90A and 90B can be rigid enough to hold stator airfoil 52 in place while being resilient enough to reduce undesirable stress and fatigue damage to stator airfoil 52. Potting material 90A and 90B can be formulated and configured to avoid failure during operating conditions expected in EGV 48.

However, should potting material 90A and 90B fail during operation of gas turbine engine 10 (and if bumper 92 were omitted), stator airfoil 52 could come loose, slide radially inward, and cause catastrophic damage to gas turbine engine 10. For example, should stator airfoil 52 slide radially inward far enough to allow radially outer edge 78 of stator airfoil 52 to fall out of OD slot 66, stator airfoil 52 could fall axially rearward and damage downstream components, such as high pressure compressor 32 (shown in FIG. 1). Thus, bumper 92 can be provided to prevent stator airfoil 52 from sliding a substantial distance should potting material 90A and 90B fail. Gap $G_2$ can be smaller than height H. Thus, if stator airfoil 52 slides so that bumper portion 82 contacts bumper surface 106 of bumper 92, gap $G_2$ can be reduced to zero and height H can remain a positive non-zero distance such that free portion 84 remains radially outward of gas path surface 64 of OD shroud 56. Thus, stator airfoil 52 can be safely retained in ID slot 70 and OD slot 66 until EGV 48 is repaired.

Bumper 92 can be made of sheet metal having a relatively thin thickness, allowing bumper 92 to be relatively light. Bumper 92 can be made of sheet metal having a substantially uniform thickness. Bumper 92 can be made of stainless steel, titanium, or another metal or non-metal material suitable for the application. Stator airfoil 52 can be made of aluminum, or another metal or non-metal suitable for the application. In embodiments where bumper 92 is made of metal (such as stainless steel) that is harder than the metal (such as aluminum) of stator airfoil 52, bumper 92 can include bend 96 and axially aligned portion 98. This allows bumper surface 106 to be relatively wide to distribute force between bumper 92 and stator airfoil 52 should they come in contact during a failure of potting material 90A and 90B. Having a relatively wide bumper surface 106 can be beneficial in applications where stator airfoil 52 is made of aluminum. In other applications where stator airfoil 52 is made of a harder material, axially aligned portion 98 can be reduced or eliminated.

Figure 3:
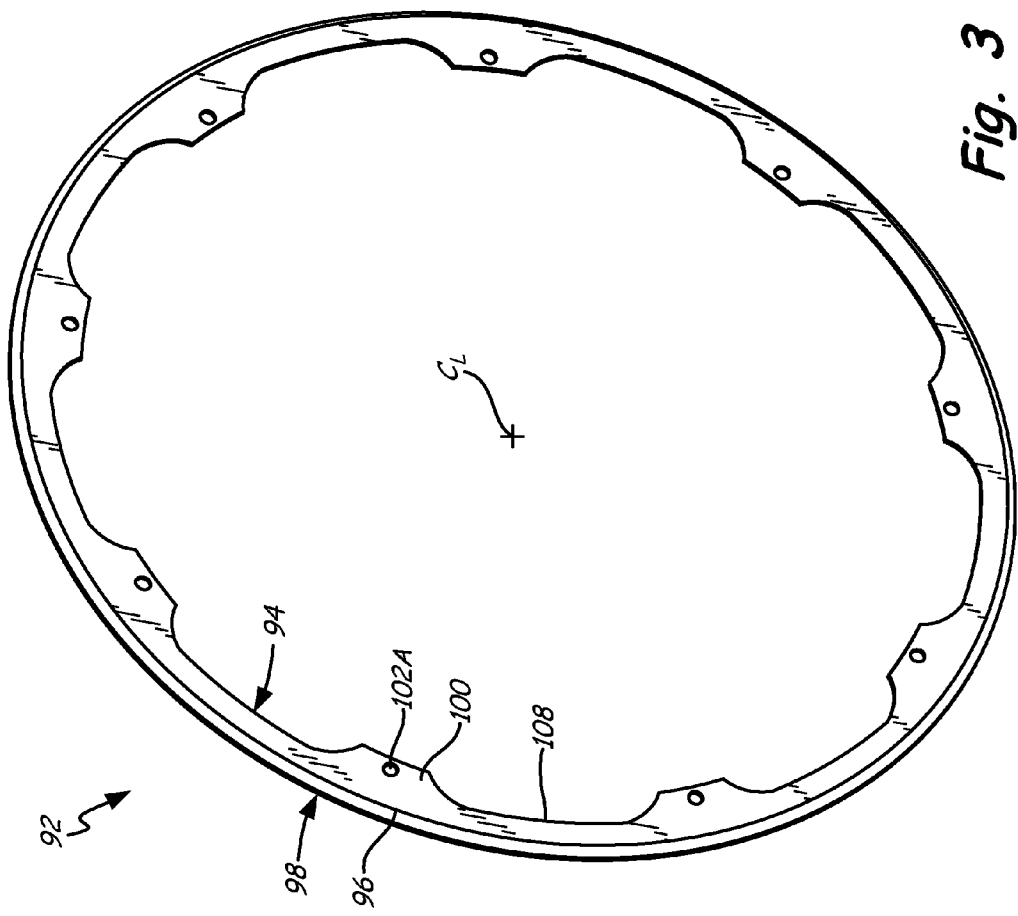
FIG. 3 is a perspective view of a bumper for use in the exit guide vane of FIG. 2.

FIG. 3 is a perspective view of bumper 92. FIG. 3 illustrates bumper 92 as a single continuous, integral bumper ring. Radially aligned portion 94 and axially aligned portion 98 are both substantially annular. In alternative embodiments, bumper 92 can be made of two or more segments. By use of a single continuous bumper ring for bumper 92, as opposed to using multiple segments, gaps between segments can be avoided, thus avoiding a potential problem of stator vane 52 (shown in FIG. 2) sliding into one of the gaps between segments.

FIG. 3 illustrates flange 100 being one of a plurality of flanges extending radially inward. In the illustrated embodiment, bumper 92 includes eleven instances of flange 100 and bolt hole 102A. Thus, bolt 104 (shown in FIG. 2) is one of a plurality of bolts, or other mechanical fasteners, that connect bumper 92 to support frame 62 (shown in FIG. 2). Each of the eleven instances of flange 100 are spaced by one of eleven instances of scallop 108. Scallop 108 is a section of radially aligned portion 94 that is scalloped to reduce weight of bumper 92.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the appended claims. For example, though bumper 92 is illustrated with respect to EGV 48, it can also be used with another type of stator assembly (such as FES 46) that benefits from bumper 92. Moreover, though bumper 92 is illustrated as a radially inner bumper ring, it can also be used as a radially outer bumper ring. Bumper 92 can be shaped as appropriate for various applications.

The invention claimed is:

1. An assembly for use in a gas turbine engine, the assembly comprising:
    an inner diameter (ID) shroud having a plurality of ID slots;
    an outer diameter (OD) shroud having a plurality of OD slots and positioned radially outward from the ID shroud;
    a plurality of stator airfoils extending from the ID shroud to the OD shroud, wherein each of the stator airfoils is positioned at least partially in one of the ID slots and is positioned at least partially in one of the OD slots; and
    a bumper ring having a radially aligned portion extending perpendicular to a centerline axis of the bumper ring, an axially aligned portion extending parallel to the centerline axis of the bumper ring, and a bend connecting the radially aligned portion to the axially aligned portion, the bumper ring being positioned proximate a first end of each of the stator airfoils so as to limit movement of the stator airfoils in a radially inward direction.

2. The assembly of claim 1, wherein the bumper ring comprises sheet metal having a substantially uniform thickness.

3. The assembly of claim 1, wherein the stator airfoils comprise aluminum.

4. The assembly of claim 1, wherein the stator airfoils are connected to the ID shroud via a first potting material and to the OD shroud via a second potting material.

5. The assembly of claim 4, wherein the first and second potting materials comprise a silicone rubber.

6. The assembly of claim 4, wherein the first and second potting materials hold the stator airfoils to be spaced from and avoid contact with the ID shroud, the OD shroud, and the bumper.

7. The assembly of claim 1, wherein the bumper is positioned radially inward of the ID shroud and the stator airfoils.

8. The assembly of claim 1, wherein the bumper is spaced from the first end of each of the stator airfoils during normal operation of the assembly.

9. The assembly of claim 1, and further comprising:
    a frame connected to at least one of the ID shroud and the OD shroud; and
    a plurality of mechanical fasteners connecting the bumper to the frame.

10. The assembly of claim 9, wherein the mechanical fasteners comprise bolts extending through a first hole in a radially extending flange of the bumper and through a second hole in the frame.

11. A bumper ring for use in a stator vane assembly in a gas turbine engine, the bumper ring comprising:
    an axially aligned annular portion extending parallel to a centerline axis of the bumper ring, having a radially outer bumper surface;
    a radially aligned annular portion extending perpendicular to the centerline axis of the bumper ring, comprising:
        a plurality of connection flanges extending radially inward; and
        holes extending axially through each of the connection flanges; and
    a bend connecting the radially aligned annular portion to the axially aligned annular portion.

12. The bumper ring of claim 11, wherein the bumper ring comprises sheet metal having a substantially uniform thickness.

13. A method of assembling a stator assembly, the method comprising:
    inserting a stator airfoil through a first slot in a first shroud and then through a second slot in a second shroud;
    attaching the stator airfoil to the first and second shrouds via resilient potting material; and
    attaching a bumper ring, having a radially aligned portion extending perpendicular to a centerline axis of the bumper ring, an axially aligned portion extending parallel to the centerline axis of the bumper ring, and a bend connecting the radially aligned portion to the axially aligned portion, proximate an end of the stator airfoil nearest the first shroud.

14. The method of claim 13, wherein resilient potting material holds the stator airfoil to be spaced from and avoid contact with the first shroud, the second shroud, and the bumper.

15. The method of claim 14, wherein the resilient potting material comprises silicone rubber applied to the first slot between the stator airfoil and the first shroud and to the second slot between the stator airfoil and the second shroud.

16. The method of claim 15, wherein the potting material is applied to the first and second slots as a liquid and then allowed to solidify.

17. The method of claim 13, wherein the stator airfoil is one of a plurality of stator airfoils and wherein the bumper is a bumper ring extending continuously around a centerline axis of the stator assembly, and wherein the bumper ring is positioned proximate and radially inward of each of the stator airfoils.

* * * * *